(12) United States Patent
Tochadse et al.

(10) Patent No.: US 12,096,531 B2
(45) Date of Patent: Sep. 17, 2024

(54) SYSTEMS AND METHOD FOR LIGHT-EMITTING DIODE (LED) FAILURE DETECTION

(71) Applicant: LUMILEDS LLC, San Jose, CA (US)

(72) Inventors: Gennadi Tochadse, Aachen-Eilendorf (DE); Josef Andreas Schug, Würselen (DE)

(73) Assignee: LUMILEDS, LLC, San José, CA (US)

( * ) Notice: Subject to any disclaimer, the term of this patent is extended or adjusted under 35 U.S.C. 154(b) by 92 days.

(21) Appl. No.: 18/081,246

(22) Filed: Dec. 14, 2022

(65) Prior Publication Data

US 2023/0189415 A1 Jun. 15, 2023

Related U.S. Application Data

(60) Provisional application No. 63/289,472, filed on Dec. 14, 2021.

(51) Int. Cl.
*H05B 45/50* (2022.01)
*B60Q 11/00* (2006.01)

(52) U.S. Cl.
CPC ........... *H05B 45/50* (2020.01); *B60Q 11/005* (2013.01)

(58) Field of Classification Search
None
See application file for complete search history.

(56) References Cited

U.S. PATENT DOCUMENTS

| 7,876,103 | B2 | | 1/2011 | Mihai et al. | |
|---|---|---|---|---|---|
| 9,481,293 | B2 | * | 11/2016 | Honma | H05B 45/10 |
| 10,560,990 | B1 | * | 2/2020 | Fragiacomo | B60Q 1/0076 |
| 11,612,034 | B2 | * | 3/2023 | Ichikawa | B60Q 1/1423 |
| 2006/0181889 | A1 | * | 8/2006 | Toda | H05B 45/10 |
| | | | | | 362/459 |
| 2011/0068696 | A1 | * | 3/2011 | van de Ven | H05B 45/48 |
| | | | | | 315/193 |
| 2011/0148301 | A1 | * | 6/2011 | Schnerr | B60Q 11/005 |
| | | | | | 315/77 |

(Continued)

FOREIGN PATENT DOCUMENTS

| AT | 5190 U1 | 4/2002 |
|---|---|---|
| WO | 2008/061301 A1 | 5/2008 |

OTHER PUBLICATIONS

International Search Report and Written Opinion mailed on May 8, 2023 for PCT International Application No. PCT/US2022/052847.

(Continued)

*Primary Examiner* — Muhammad Adnan
(74) *Attorney, Agent, or Firm* — Volpe Koenig

(57) ABSTRACT

An LED lighting system, an automotive lighting system and a method of detecting failure in an LED lighting system are described herein. An LED lighting system includes an LED lighting circuit and a failure detection circuit. The LED lighting circuit includes a first string of a first plurality of LEDs electrically coupled in series with a first inductor and a second string of a second plurality of LEDs electrically coupled in series with a second inductor. The first and second strings each have an equal total forward voltage. The failure detection circuit is configured to detect a failure in the LED lighting circuit based on detection of a voltage difference between the first inductor and the second inductor.

19 Claims, 5 Drawing Sheets

(56) References Cited

U.S. PATENT DOCUMENTS

| | | | |
|---|---|---|---|
| 2011/0241549 A1* | 10/2011 | Wootton | F21V 29/60 |
| | | | 257/E33.012 |
| 2012/0019156 A1 | 1/2012 | Jin | |
| 2012/0169345 A1* | 7/2012 | Wang | G01R 31/2635 |
| | | | 324/414 |
| 2015/0130439 A1* | 5/2015 | Wang | H03H 7/40 |
| | | | 323/299 |
| 2015/0188487 A1* | 7/2015 | Yoshidomi | H02S 50/10 |
| | | | 324/761.01 |
| 2015/0301128 A1* | 10/2015 | Kovatchev | G01R 31/44 |
| | | | 324/414 |
| 2017/0182941 A1* | 6/2017 | Ohta | H05B 45/52 |
| 2017/0208655 A1* | 7/2017 | Lee | G01R 31/44 |
| 2018/0081037 A1* | 3/2018 | Medina | G01S 7/497 |
| 2018/0184491 A1* | 6/2018 | Walters | B60Q 11/005 |
| 2019/0098710 A1* | 3/2019 | Murakami | H05B 45/50 |
| 2019/0208589 A1 | 7/2019 | Satterfield et al. | |
| 2020/0178367 A1* | 6/2020 | Hara | H05B 45/48 |
| 2020/0202799 A1* | 6/2020 | Wang | G09G 3/3406 |
| 2021/0378070 A1* | 12/2021 | Ichikawa | H05B 45/56 |
| 2022/0361301 A1* | 11/2022 | Lewis | H05B 45/12 |
| 2023/0060280 A1* | 3/2023 | Tochadse | F21S 41/148 |
| 2023/0064700 A1* | 3/2023 | Tochadse | H05B 45/357 |

OTHER PUBLICATIONS

Suchoski, "Designing daytime running lights, part 1: adding one-fail-all-fail LED fault detection," (Dec. 4, 2018).
STMicroelectronics, TN0026 Technical Note, LED balancing circuits (2021).

* cited by examiner

SYSTEMS AND METHOD FOR LIGHT-EMITTING DIODE (LED) FAILURE DETECTION

CROSS REFERENCE TO RELATED APPLICATIONS

This application claims the benefit of U.S. Provisional Patent Application No. 63/289,472, which was filed on Dec. 14, 2021, the contents of which are hereby incorporated by reference herein.

BACKGROUND

LED light sources may include multiple LEDs connected in series or parallel. A parallel connection of two equal LED strings may be used, for example, in applications such as automotive retrofit lamps for headlights.

SUMMARY

An LED lighting system, an automotive lighting system and a method of detecting failure in an LED lighting system are described herein. An LED lighting system includes an LED lighting circuit and a failure detection circuit. The LED lighting circuit includes a first string of a first plurality of LEDs electrically coupled in series with a first inductor and a second string of a second plurality of LEDs electrically coupled in series with a second inductor. The first and second strings each have an equal total forward voltage. The failure detection circuit is configured to detect a failure in the LED lighting circuit based on detection of a voltage difference between the first inductor and the second inductor.

BRIEF DESCRIPTION OF THE DRAWINGS

A more detailed understanding can be had from the following description, given by way of example in conjunction with the accompanying drawings wherein.

DETAILED DESCRIPTION

Figure 1:
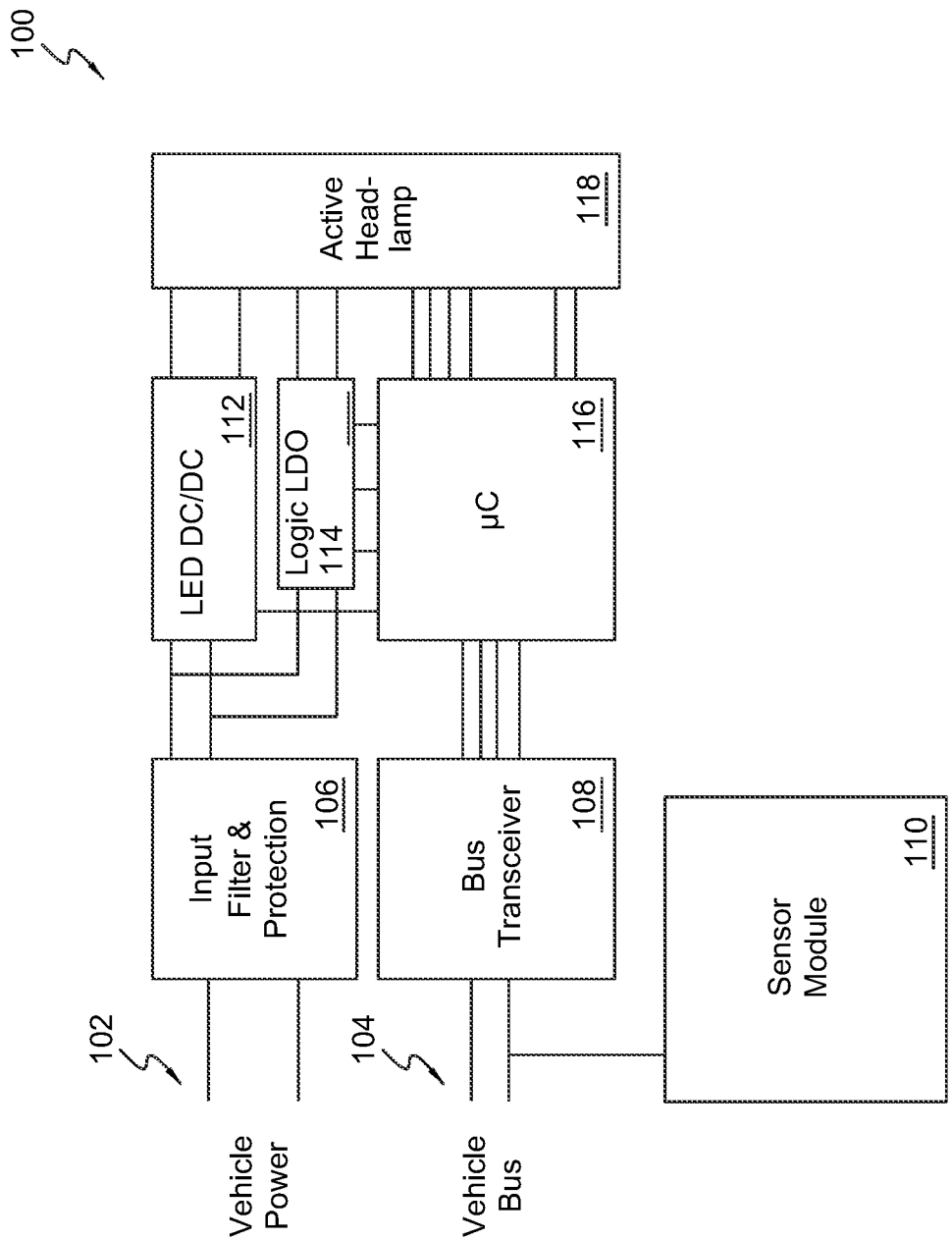
FIG. 1 is a diagram of an example vehicle headlamp system.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Failure detection in LED lighting systems, such as detection of a single LED short or disconnection of an LED or an entire string of LEDs, may be desirable or even required, such as in automotive applications. Currently, LED lighting systems may provide for failure detection of LED shorts in a single LED string based on measurements of the LED string voltage and comparison to a reference voltage. For such systems, then, the LED string forward voltage drop needs to be compared to a certain value. This may be difficult to implement in practice if the LED package has no additional contact to a single LED, for example because of LED voltage temperature dependence and/or LED voltage production spread. In addition, in implementations where multiple LED strings are coupled in parallel and have equal total forward voltages (also referred to herein as equal LED strings), such as automotive headlamp systems that may incorporate two LED strings that have equal total forward voltages (also referred to herein as equal LED strings), if one string becomes disconnected, no significant voltage change of the second LED string or any other LED string coupled in parallel with that string may be measured or detected. Accordingly, embodiments described herein provide for LED failure detection in LED lighting systems that include multiple equal LED strings, which may, in addition to detecting a single LED short, detect disconnection of an entire LED string as well, and without requirement of additional contact to single LEDs or a certain reference voltage.

FIG. 1 is a diagram of an example vehicle headlamp system 100 that may incorporate one or more of the embodiments and examples described herein. The example vehicle headlamp system 100 illustrated in FIG. 1 includes power lines 102, a data bus 104, an input filter and protection module 106, a bus transceiver 108, a sensor module 110, an LED direct current to direct current (DC/DC) module 112, a logic low-dropout (LDO) module 114, a micro-controller 116 and an active head lamp 118.

The power lines 102 may have inputs that receive power from a vehicle, and the data bus 104 may have inputs/outputs over which data may be exchanged between the vehicle and the vehicle headlamp system 100. For example, the vehicle headlamp system 100 may receive instructions from other locations in the vehicle, such as instructions to turn on turn signaling or turn on headlamps, and may send feedback to other locations in the vehicle if desired. The sensor module 110 may be communicatively coupled to the data bus 104 and may provide additional data to the vehicle headlamp system 100 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 100. In FIG. 1, the headlamp controller may be a micro-controller, such as micro-controller (pc) 116. The micro-controller 116 may be communicatively coupled to the data bus 104.

The input filter and protection module 106 may be electrically coupled to the power lines 102 and may, for example, support various filters to reduce conducted emissions and provide power immunity. Additionally, the input filter and protection module 106 may provide electrostatic discharge (ESD) protection, load-dump protection, alternator field decay protection, and/or reverse polarity protection.

The LED DC/DC module 112 may be coupled between the input filter and protection module 106 and the active headlamp 118 to receive filtered power and provide a drive current to power LEDs in the LED array in the active headlamp 118. The LED DC/DC module 112 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 114 may be coupled to the input filter and protection module 106 to receive the filtered power. The logic LDO module 114 may also be coupled to the micro-controller 116 and the active headlamp 118 to provide power to the micro-controller 116 and/or electronics in the active headlamp 118, such as CMOS logic.

The bus transceiver 108 may have, for example, a universal asynchronous receiver transmitter (UART) or serial peripheral interface (SPI) interface and may be coupled to the micro-controller 116. The micro-controller 116 may translate vehicle input based on, or including, data from the sensor module 110. The translated vehicle input may include a video signal that is transferrable to an image buffer in the active headlamp 118. In addition, the micro-controller 116 may load default image frames and test for open/short pixels during startup. In embodiments, an SPI interface may load an image buffer in CMOS. Image frames may be full frame, differential or partial frames. Other features of micro-controller 116 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 2:
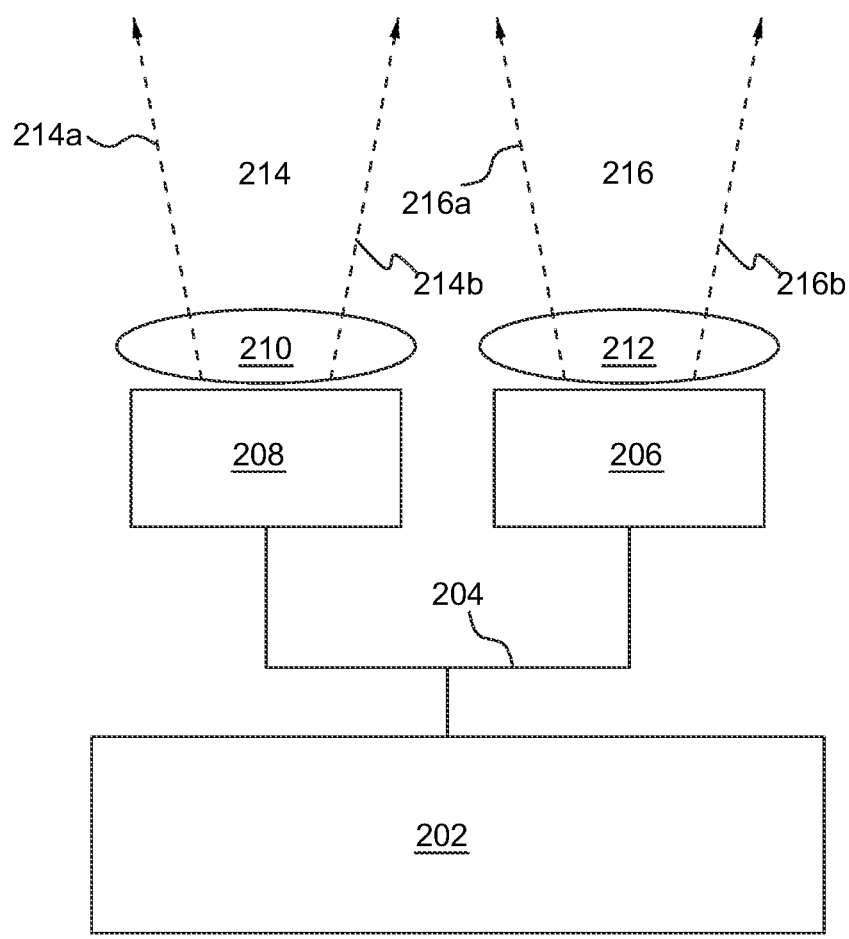
FIG. 2 is a diagram of another example vehicle headlamp system.

FIG. 2 is a diagram of another example vehicle headlamp system 200. The example vehicle headlamp system 200 illustrated in FIG. 2 includes an application platform 202, two LED lighting systems 206 and 208, and secondary optics 210 and 212.

The LED lighting system 208 may emit light beams 214 (shown between arrows 214a and 214b in FIG. 2). The LED lighting system 206 may emit light beams 216 (shown between arrows 216a and 216b in FIG. 2). In the embodiment shown in FIG. 2, a secondary optic 210 is adjacent the LED lighting system 208, and the light emitted from the LED lighting system 208 passes through the secondary optic 210. Similarly, a secondary optic 212 is adjacent the LED lighting system 206, and the light emitted from the LED lighting system 206 passes through the secondary optic 212. In alternative embodiments, no secondary optics 210/212 are provided in the vehicle headlamp system.

Where included, the secondary optics 210/212 may be or include one or more light guides. The one or more light guides may be edge lit or may have an interior opening that defines an interior edge of the light guide. LED lighting systems 208 and 206 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 208 and 206 in a desired manner, such as, for example, with a gradient, a chamfered distribution, a narrow distribution, a wide distribution, or an angular distribution.

The application platform 202 may provide power and/or data to the LED lighting systems 206 and/or 208 via lines 204, which may include one or more or a portion of the power lines 102 and the data bus 104 of FIG. 1. One or more sensors (which may be the sensors in the vehicle headlamp system 200 or other additional sensors) may be internal or external to the housing of the application platform 202. Alternatively, or in addition, as shown in the example vehicle headlamp system 100 of FIG. 1, each LED lighting system 208 and 206 may include its own sensor module, connectivity and control module, power module, and/or LED array.

In embodiments, the vehicle headlamp system 200 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 206 and 208 may be sensors (e.g., similar to sensors in the sensor module 110 of FIG. 1) that identify portions of a scene (e.g., roadway or pedestrian crossing) that require illumination.

Figure 3:
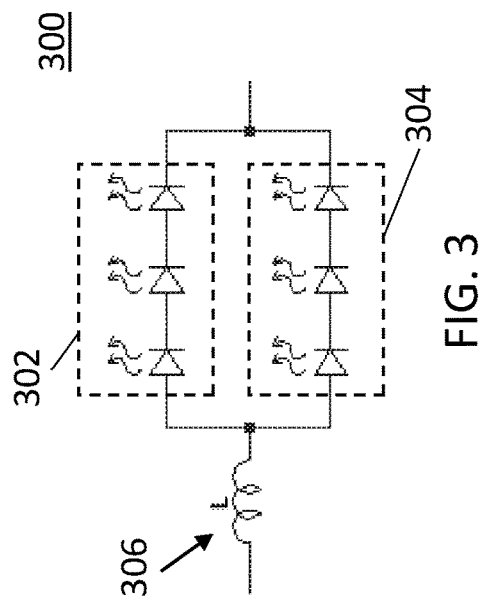
FIG. 3 is a circuit diagram of an example connection of two LED strings for a vehicle headlamp system.

FIG. 3 is a circuit diagram 300 of an example connection of two LED strings for a vehicle headlamp system. In the example illustrated in FIG. 3, two strings of LEDs 302 and 304 are electrically coupled together in parallel. Each of the LED strings 302 and 304 has three LEDs. While two strings of three LEDs each are illustrated in FIG. 3, one of ordinary skill in the art would understand that more than two strings of LEDs and strings of any number of LEDs may be used consistent with embodiments described herein. In an example implementation, the LED strings 302 and 304 may be a part of, for example, the active headlamp 118 of the vehicle headlamp system of FIG. 1.

Each of the LEDs in the LED strings 302 and 304 may have a forward voltage, and the total forward voltage of each string may equal the sum of the forward voltages of all of the LEDs of the string. In embodiments described herein, the total forward voltage of multiple strings electrically coupled together in parallel may have an equal or substantially equal forward voltage (e.g., the total forward voltages may be equal plus or minus a small amount of natural variance due to LED production, wiring, etc.).

The parallel coupled LED strings 302 and 304 may be electrically coupled in series with an inductor 306. In an example implementation, the inductor 306 may be, for example, a part of the LED DC/DC 112 or part of any LED driver circuit.

Figure 4B:
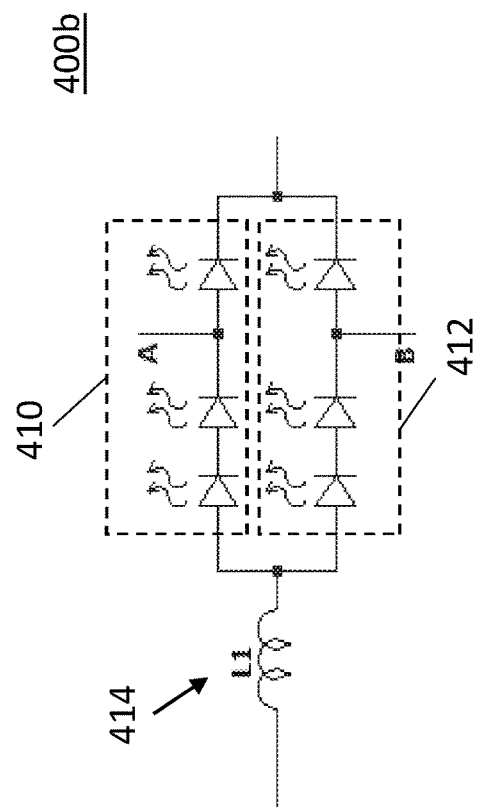
FIG. 4B is a circuit diagram of another example connection of two LED strings configured to use with LED failure detection.
Figure 4A:
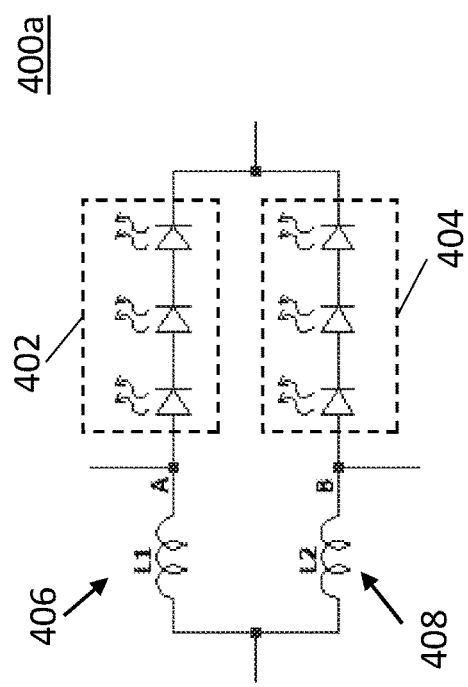
FIG. 4A is a circuit diagram of an example connection of two LED strings configured for use with LED failure detection.

FIG. 4A is a circuit diagram 400a of an example connection of two LED strings configured for use with LED failure detection. In the example illustrated in FIG. 4A, two strings of LEDs 402 and 404 are electrically coupled together in parallel. Each of the LED strings 402 and 404 has three LEDs. As with the example illustrated in FIG. 3, while two strings of three LEDs each are illustrated in FIG. 4A, one of ordinary skill in the art would understand that more than two strings of LEDs and strings of any number of LEDs may be used consistent with embodiments described herein. In an example implementation, the LED strings 402 and 404 may be a part of, for example, the active headlamp 118 of the vehicle headlamp system of FIG. 1.

Each of the LEDs in the LED strings 402 and 404 may have a forward voltage, and the total forward voltage of multiple strings electrically coupled together in parallel may have an equal or substantially equal forward voltage (e.g., the total forward voltages may be equal plus or minus a small amount of natural variance due to LED production, wiring, etc.).

As compared to FIG. 3, in the example illustrated in FIG. 4A, each string of LEDs 402, 404 is electrically coupled in series with an individual inductor 406 and 408. Thus, in the example illustrated in FIG. 4A, a string of LEDs 402 is electrically coupled in series with an inductor 406, a string of LEDs 404 is electrically coupled in series with an inductor 408, and the two series circuits are electrically coupled together in parallel. In an example implementation, the inductors 406 and 408 may be, for example, a part of the LED DC/DC 112 or part of any LED driver circuit.

As illustrated in FIG. 4A, the string of LEDs 402 is electrically coupled in series with the inductor 406 via a point A, and the string of LEDs 404 is electrically coupled in series with inductor 408 via a point B. Points A and B may be the measurement points for LED failure detection. Such LED failure detection may exploit the equality of the multiple LED strings and just measure the voltage difference between the two inductors at points A and B in the illustrated example. If there are no LED problems in any of the LED strings, the voltage difference will be 0 or close to zero (accounting for a small amount of natural variance in the circuits). In other words, if there are no LED problems in any of the LED strings, the voltage difference will not be detectable. However, if a single LED is shorted, or an entire string or single LED becomes disconnected, a well detectable voltage can be measured and used for failure detection. In some embodiments, the voltage difference can be used as a failure signal to trigger shut off of some part of the lighting system, such as LED DC/DC 112 and/or the active headlamp 118 of FIG. 1.

FIG. 4B is a circuit diagram of another example connection of two LED strings configured to use with LED failure detection. In the example illustrated in FIG. 4B, the arrangement of LEDs and inductor(s) are similar to the arrangement illustrated in FIG. 3 with the use of only a single inductor. In particular, in the example illustrated in FIG. 4B, two strings of LEDs 410 and 412 are electrically coupled together in parallel. Each of the LED strings 410 and 412 has three LEDs. While two strings of three LEDs each are illustrated in FIG. 4B, one of ordinary skill in the art would understand that more than two strings of LEDs and strings of any number of LEDs may be used consistent with embodiments described herein. In an example implementation, the LED strings 410 and 412 may be a part of, for example, the active headlamp 118 of the vehicle headlamp system of FIG. 1.

Each of the LEDs in the LED strings 410 and 412 may have a forward voltage, and the total forward voltage of each string may equal the sum of the forward voltages of all of the LEDs of the string. In embodiments described herein, the total forward voltage of multiple strings electrically coupled together in parallel may have an equal or substantially equal forward voltage (e.g., the total forward voltages may be equal plus or minus a small amount of natural variance due to LED production, wiring, etc.).

The parallel coupled LED strings 410 and 412 may be electrically coupled in series with an inductor 414. In an example implementation, the inductor 414 may be, for example, a part of the LED DC/DC 112 or part of any LED driver circuit.

As compared to the example illustrated in FIG. 4A, in the example illustrated in FIG. 4B, measurement points for the voltage comparison for LED failure detection may be located in the middle of each string of LEDs 410 and 412 (e.g., at points A and B illustrated in FIG. 4B) rather than between the respective string of LEDs and its respective inductor. Such an embodiment, however, may require additional contacts to single LEDs, but the voltage difference method of LED failure detection described above with respect to FIG. 4A may still be used in such an embodiment.

Figure 5:
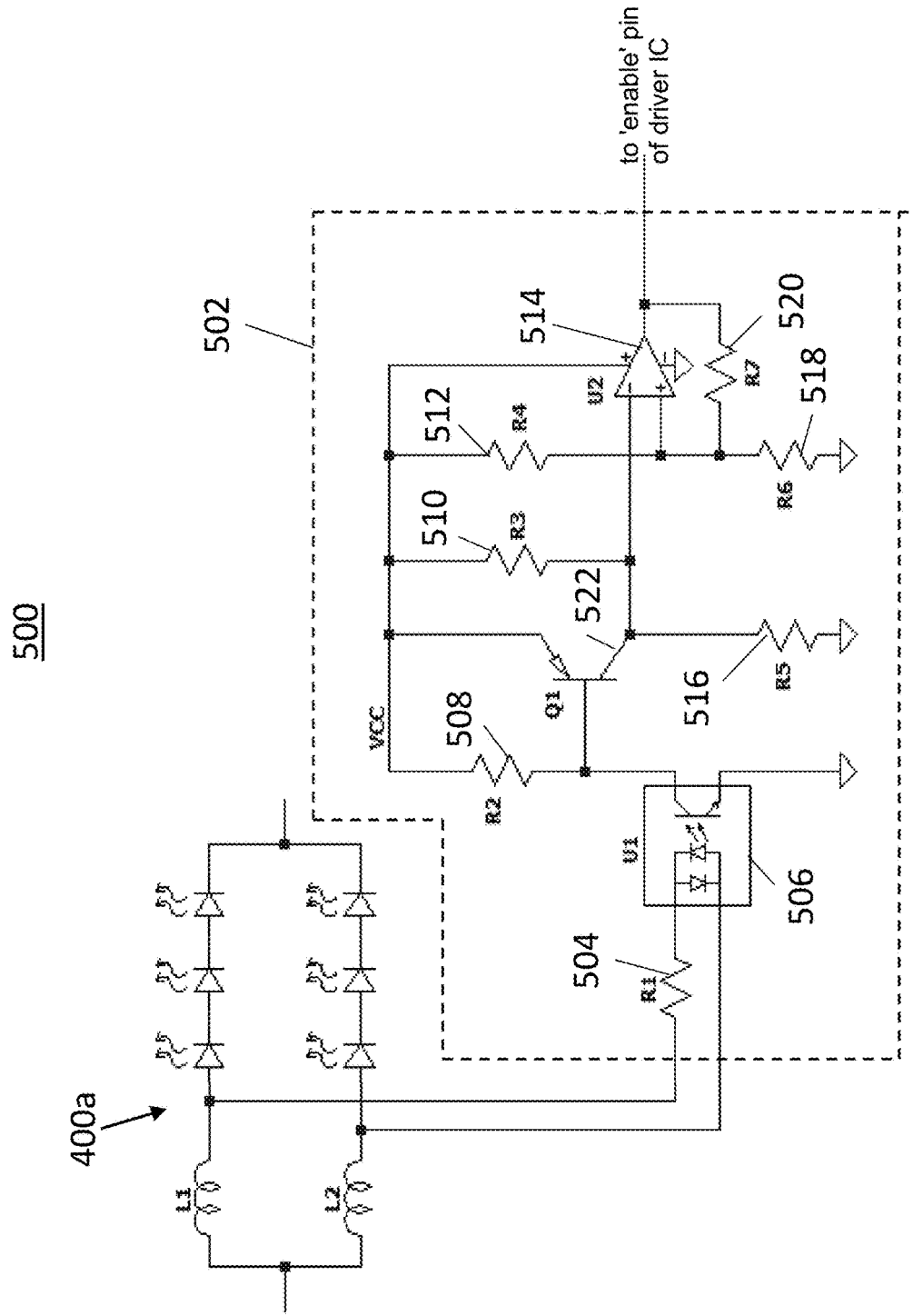
FIG. 5 is a circuit diagram of an example connection of two LED strings and an example LED failure detection circuit.

FIG. 5 is a circuit diagram 500 of an example connection of two LED strings 400a and an example LED failure detection circuit 502. In the example illustrated in FIG. 5, the failure detection circuit 502 includes a bidirectional optocoupler 506 and a Schmitt Trigger 514 to detect a voltage difference between the points A and B in the circuit 400a and provide a signal to enable pin of a driver IC. While not shown in FIG. 5, the driver, such as the LED DC/DC 112 of FIG. 1, may be a driver integrated circuit (IC) with a number of input and output pins. One of the input pins may be an enable pin to activate or deactivate the driver. The output of the Schmitt Trigger 514 may be communicatively coupled to the enable pin of the driver IC and may disable the driver IC if a voltage difference between the points A and B is detected.

In the example illustrated in FIG. 5, the inputs of the optocoupler 406 are electrically coupled to the inductors in the circuit 400a (e.g., at points A and B not labeled in FIG. 5). A resistor 504 may be provided between one of the inputs of the optocoupler 406 and one of the inductors in the circuit 400a. An output of the optocoupler 406 is electrically coupled to a transistor 522, which is electrically coupled in parallel with a resistor 508. When or if there is a significant imbalance between the multiple LED strings (e.g., the two strings of circuit 400*a*), a current may flow through the optocoupler 506, and the voltage at the base of the transistor 522 may become low. In other words, the optocoupler 506 may detect a voltage difference between the points A and B, and, therefore, it can be said that the voltage difference between the points A and B may be a voltage difference that is detectable by the optocoupler 506.

The collector of the transistor 522 may be electrically coupled to the inverting input of the Schmitt Trigger 514. The inverting input of the Schmitt Trigger 514 may become high when the voltage at the base of the transistor 522 becomes low and may remain in that state as long as the circuit is powered by an input voltage. The output of the Schmitt Trigger 514 may be used to deactivate the LED driver. For example, the output of the Schmitt Trigger 514 may be communicatively coupled to the enable pin of a driver IC and configured to deactivate the driver IC when the inverting input of the Schmitt Trigger 514 becomes high. The circuit 500 illustrated in FIG. 5 includes additional resistors 510, 512, 518 and 520. The required thresholds of the Schmitt Trigger 514 may be set by adjusting the resistor values of the resistors 512, 518 and 520. The resistor value of the resistor 510 may define the low level signal at the inverting input of the Schmitt Trigger 514.

While one example Schmitt Trigger 514 is illustrated in FIG. 5, one of ordinary skill in the art will understand that Schmitt Triggers can be constructed different ways. For example, a Schmitt Trigger built on discrete transistors can be used in place of the Schmitt Trigger 514 illustrated in FIG. 5.

Figure 6:
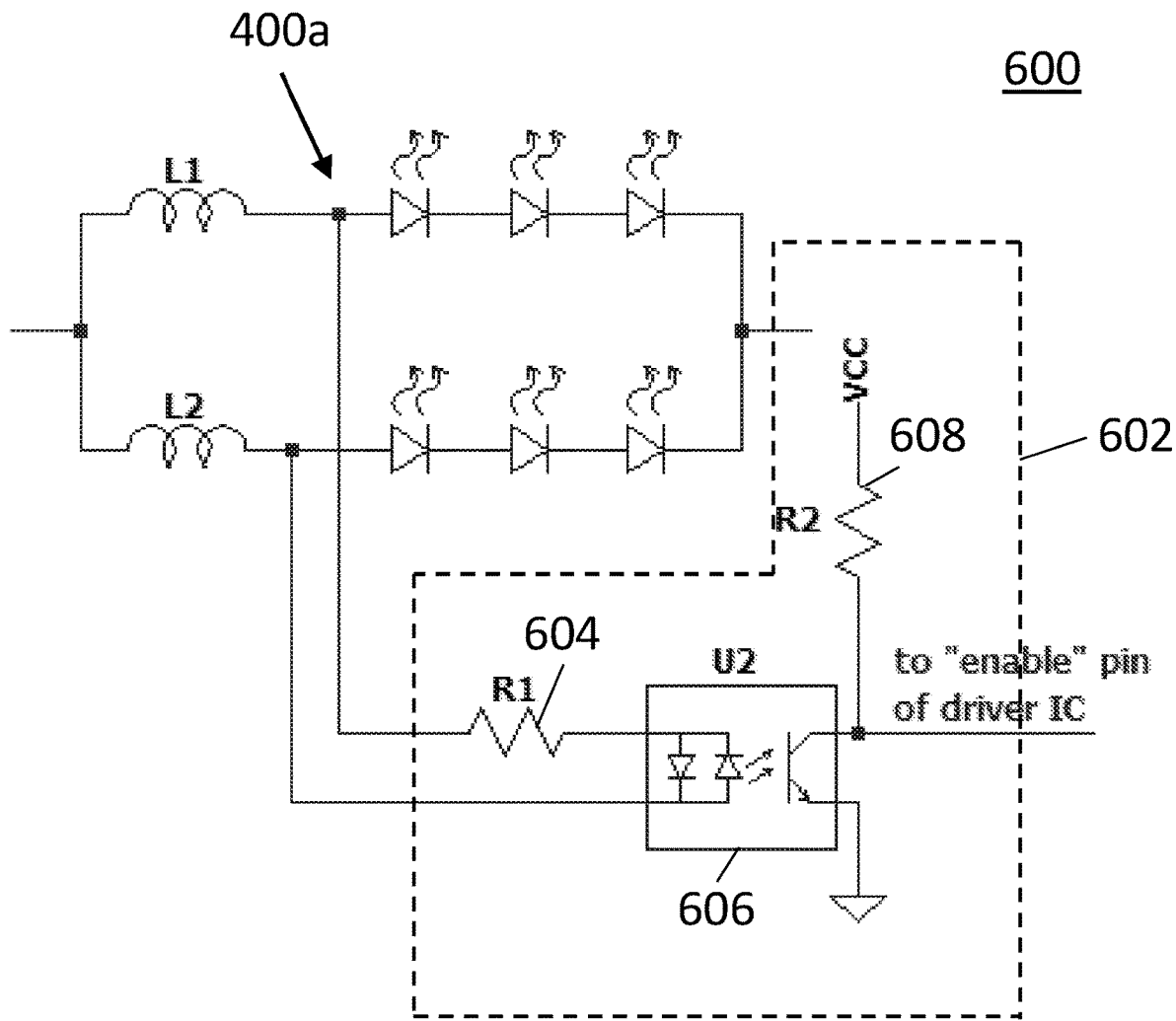
FIG. 6 is a circuit diagram of an example connection of two LED strings and another example LED failure detection circuit.

FIG. 6 is a circuit diagram 600 of an example connection of two LED strings 400*a* and another example LED failure detection circuit 602. As compared to the LED failure detection circuit 502 of FIG. 5, the LED failure detection circuit 602 illustrated in FIG. 6 is a much simpler implementation. In the example illustrated in FIG. 6, the LED failure detection circuit 602 simply includes an optocoupler 606. As in FIG. 5, the inputs of the optocoupler 606 may be electrically coupled to the inductors in the circuit 400*a* (e.g., at points A and B not labeled in FIG. 6). A resistor 604 may be provided between one of the inputs of the optocoupler 606 and one of the inductors in the circuit 400*a*.

In the example of FIG. 6, the output of the optocoupler 606 can be used for LED driver control. For example, while not shown in FIG. 6, the driver for the LEDs in circuit 400*a*, such as the LED DC/DC 112 of FIG. 1, may be a driver integrated circuit (IC) with a number of input and output pins. One of the input pins may be an enable pin to active or deactivate the driver. The output of the optocoupler 606 may be directly connected to the enable pin of the driver IC and may disable the driver IC if a voltage difference between the points A and B is detected.

Due to alternating voltage between the inductors in the circuit 400*a*, when or if there is a significant imbalance between multiple LED strings, a unidirectional optocoupler may be used instead of the bidirectional optocoupler illustrated in FIGS. 5 and 6.

One of ordinary skill in the art will understand that the example LED detection circuits described herein are just examples and other circuits may be used consistent with the embodiments described herein, such as a comparator circuit.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light-emitting diode (LED) lighting system comprising:
    an LED lighting circuit comprising:
        a first string of a first plurality of LEDs electrically coupled in series with a first inductor,
        a second string of a second plurality of LEDs electrically coupled in series with a second inductor, the first and second strings each having an equal total forward voltage; and
        a failure detection circuit configured to detect a failure in the LED lighting circuit based on detection of a voltage difference between the first inductor and the second inductor.

2. The system of claim 1, wherein the first plurality of LEDs are electrically coupled together in series and the second plurality of LEDs are electrically coupled together in series.

3. The system of claim 1, wherein the first plurality of LEDs are electrically coupled together in parallel and the second plurality of LEDs are electrically couple together in parallel.

4. The system of claim 1, wherein the first string and the second string are electrically coupled together in parallel.

5. The system of claim 1, wherein the voltage difference is a difference in voltage level that is detectable by at least one of a unidirectional optocoupler, a bidirectional optocoupler or a comparator.

6. The system of claim 1, wherein the voltage difference is a defined threshold voltage level.

7. The system of claim 1, wherein the failure detection indicates at least one of a single LED short in one of the first string or the second string or a disconnection of one of the first string or the second string.

8. An automotive lighting system comprising:
    a headlamp comprising:
        a first string of a first plurality of LEDs, and
        a second string of a second plurality of LEDs,
        the first and second strings each having an equal total forward voltage;
    a driver for the headlamp comprising:
        a first inductor electrically coupled in series with the first string of the first plurality of LEDs, and
        a second inductor electrically coupled in series with the second string of the second plurality of LEDs,
        the driver being configured to be disabled based on a voltage difference between the first inductor and the second inductor.

9. The system of claim 8, further comprising a failure detection circuit configured to detect a failure in the headlamp based on detection of the voltage difference between the first inductor and the second inductor.

10. The system of claim 8, wherein:
    the driver is a driver integrated circuit (IC) and comprises an enable pin, and
    the failure detection circuit is communicatively coupled to the enable pin to disable the driver IC based on the failure detected in the headlamp.

11. The system of claim 8, wherein the voltage difference is a difference in voltage level that is detectable by at least one of a unidirectional optocoupler, a bidirectional optocoupler or a comparator.

12. The system of claim 8, wherein the voltage difference is a defined threshold voltage level.

13. The system of claim 8, wherein the first plurality of LEDs are electrically coupled together in series and the second plurality of LEDs are electrically coupled together in series.

14. The system of claim 8, wherein the first plurality of LEDs are electrically coupled together in parallel and the second plurality of LEDs are electrically couple together in parallel.

15. The system of claim 8, wherein the first string and the second string are electrically coupled together in parallel.

16. The system of claim 8, wherein the failure detection indicates at least one of a single LED short in one of the first string or the second string or a disconnection of one of the first string or the second string.

17. A method of detecting a failure in a light-emitting diode (LED) lighting system, the method comprising:

measuring a first voltage at a first point in a first circuit between a first string of a first plurality of LEDs and a first inductor;

measuring a second voltage at a second point in a second circuit between a second string of a second plurality of LEDs and second inductor, the first and second strings each having an equal total forward voltage; and disabling a driver for the first and second strings based on a detectable voltage difference between the measured voltages at the first and second points.

18. The method of claim 17, further comprising detecting the voltage difference between the measured voltages at the first and second points.

19. The method of claim 17, wherein the failure detection indicates at least one of a single LED short in one of the first string or the second string or a disconnection of one of the first string or the second string.

* * * * *